United States Patent [19]

Kanemura et al.

[11] Patent Number: 4,542,201
[45] Date of Patent: Sep. 17, 1985

[54] RESIN FOR HIGH-REFRACTIVITY LENSES AND LENSES MADE OF SAME RESIN

[75] Inventors: Yoshinobu Kanemura, Kamakura; Masao Imai; Katsuyoshi Sasagawa, both of Yokohama, all of Japan

[73] Assignee: Mitsui Toatsu Chemicals Incorporated, Tokyo, Japan

[21] Appl. No.: 668,884

[22] Filed: Nov. 6, 1984

[30] Foreign Application Priority Data

Nov. 11, 1983 [JP] Japan ............................. 58-212177

[51] Int. Cl.⁴ ............................................. C08F 218/00
[52] U.S. Cl. .................................... 526/314; 350/409; 350/410; 523/106; 526/291; 526/292.1
[58] Field of Search ............ 526/313, 314, 291, 292.1; 350/409, 410

[56] References Cited

U.S. PATENT DOCUMENTS

| | | | |
|---|---|---|---|
| 2,455,652 | 12/1948 | Bralley et al. | 526/314 |
| 2,529,867 | 11/1950 | Carlson | 526/314 |
| 2,587,442 | 2/1952 | Carlson | 526/314 |
| 4,260,564 | 4/1981 | Baiocchi et al. | 526/314 |
| 4,306,780 | 12/1981 | Tarumi et al. | 526/313 |
| 4,310,642 | 1/1982 | Margotte et al. | 526/314 |

Primary Examiner—Lester L. Lee
Attorney, Agent, or Firm—Fisher, Christen & Sabol

[57] ABSTRACT

Disclosed herein are a resin for high-refractivity lenses, formed by copolymerizing at least one carbonate compound represented by the general formula (I):

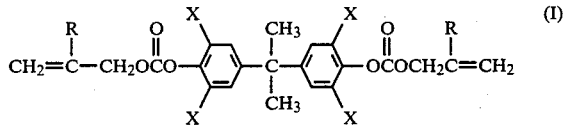

wherein X is a hydrogen, chlorine or bromine atom, and R is a hydrogen atom or a methyl group with at least one unifunctional monomer represented by the general formula (II):

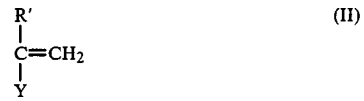

wherein
R' is a hydrogen atom or a methyl group and Y represents

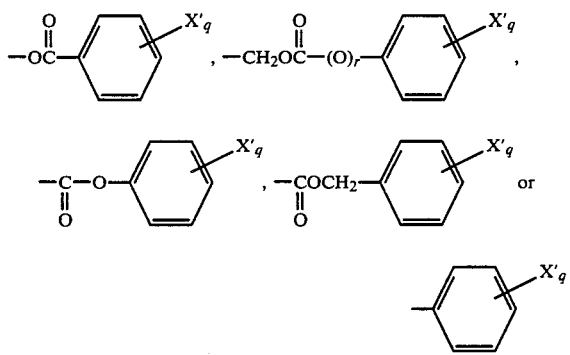

wherein X' is a chlorine or bromine atom, q is an integer of 0–5, and r is 0 or 1 as well as high-refractivity lenses made of such a resin.

The lens-making resin according to this invention has a high refractive index, is excellent in processability such as grinding processability, thermal resistance, solvent resistance and impact resistance. Moreover, it features outstanding miscibility between the unifunctional monomer and the carbonate upon copolymerization thereof, and minimized polymerization strain.

2 Claims, No Drawings

RESIN FOR HIGH-REFRACTIVITY LENSES AND LENSES MADE OF SAME RESIN

DESCRIPTION

1. Technical Field

This invention relates to a lens-making resin having a high refractive index and a lens made of the above resin.

2. Background Art

Plastic lenses have found increasing commercial utility as eyeglass lenses, camera lenses and other optical lenses in recent years, since they are lighter in weight, less fragile and more readily colored in comparison with inorganic glass lenses. As a resin which is currently used in a large volume for the above application, there is a resin obtained by the casting-polymerization of diethylene glycol bisallylcarbonate (hereinafter called "CR-39"). However, the refractive index ($n_d$) of the above resin is 1.50, which is smaller compared with those of inorganic glass lenses ($n_d$=about 1.52). In order to achieve the same optical characteristics as glass lenses, it is necessary to increase the central thickness, peripheral thickness and curvature of each plastic lens, thereby unavoidably making the plastic lens thicker as a whole. For this reason, there is an outstanding desire for the development of a lens-making resin having a still higher refractive index. As resins having high refractive indexes, there have already been known polycarbonate ($n_d$=1.58–1.59), polystyrene ($n_d$=1.58–1.60), etc. These resins are each a two-dimensional polymer structurally and thermoplastic. They are thus unsuitable for casting-polymerization method which is suitable for production of articles in various models such as fabrication of eyeglass lenses, and their post-molding processings, especially, their rough-grinding and smoothing (hereinafter merely referred to as "grinding") work is difficult. Therefore, use of these resins are presently limited to some sort of safety eyeglasses and the like.

Accordingly, there is a strong desire for the development of a lens-making resin which has a refractive index higher than that of the lens-making resin prepared by polymerizing CR-39, can be cast-polymerized similar to CR-39 and does not make diamond-made grindstones loaded owing to its three-dimensional crosslinking structure when grinding molded lens blanks. A variety of researchers have already been carried out with a view toward developing a resin which would meet the above-mentioned desire, resulting in proposals of resins obtained by copolymerizing CR-39 and second monomers having refractive indexes higher than that of CR-39 when measured as their respective homopolymers (see, Japanese Patent Laid-open Nos. 79353/1976, 7787/1978, 15118/1980 and 36601/1981). The refractive indexes of the thus-copolymerized resins are however inherently limited because they employ CR-39 as their principal components. It was thus difficult to obtain a resin having a high refractive index, for example, a refractive index of 1.55 or higher.

In order to obtain a resin having a still higher refractive index, it is urged to use a bifunctional monomer which can afford a homopolymer having a refractive index higher than that of CR-39. However, each of bifunctional monomers which have been proposed to date resulted in a polymer having impact resistance much poorer compared with the homopolymer of CR-39 when polymerized singly. Thus, some attempts have been made to improve the impact resistance of these bifunctional monomers by copolymerizing them with a unifunctional monomer. Here, each matching unifunctional monomer is required to have a high refractive index when measured as its homopolymer if one wants to obtain a copolymer having a high refractive index. For this reason, styrene or a halogen-substituted styrene is presently used as such a unifunctional monomer. However, use of bifunctional monomers different from CR-39, which have heretofore been proposed, in combination with the above-mentioned unifunctional monomers is accompanied by such drawbacks that it tends to result in development of polymerization strain and is difficult to obtain polymers having uniform refractivity distribution because there are considerable differences in polymerization reactivity between such bifunctional monomers and unifunctional monomers and the proportions of the bifunctional monomers and unifunctional monomers cannot be varied freely due to poor miscibility therebetween.

With the foregoing in view, the present inventors carried out an extensive research with a view toward making improvements to the above-described drawbacks. As a result, it has been found that a resin, which has a high refractive index and excellent processability such as grinding processability and superb impact resistance, exhibits excellent miscibility between its starting unifunctional monomer and bifunctional monomer upon copolymerization thereof, is less susceptible of developing polymerization strain and is thus suitable for use in the production of high-refractivity lenses, can be obtained by copolymerizing a specific bifunctional monomer and a unifunctional monomer having a refractive index of at least 1.55 as a homopolymer, capable of undergoing a radical polymerization and containing an aromatic ring, leading to completion of this invention.

DISCLOSURE OF THE INVENTION

This invention therefore provides a resin for high-refractivity lenses, which contains structural units represented by the following general formulas (III) and (IV):

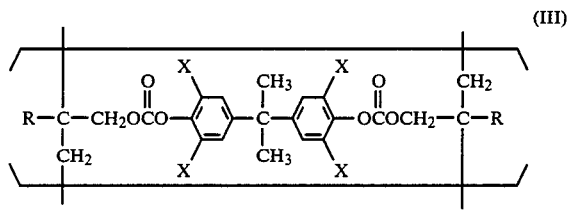

wherein X is a hydrogen, chlorine or bromine atom and R is a hydrogen atom or a methyl group, and

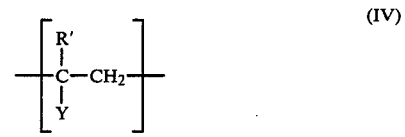

wherein R' is a hydrogen atom or a methyl group and Y represents

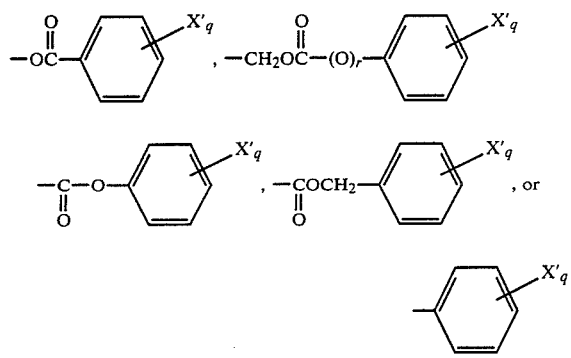

wherein X' is a chlorine or bromine atom, q is an integer of 0–5, and r is 0 or 1, which resin is formed by the copolymerization of at least one carbonate compound represented by the general formula (I):

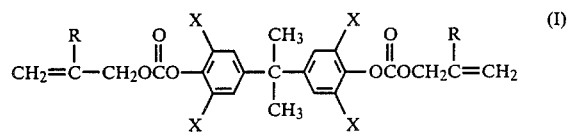

wherein X is a hydrogen, chlorine or bromine atom and R is a hydrogen atom or a methyl group with at least one unifunctional monomer represented by the general formula (II):

wherein R' is a hydrogen atom or a methyl group and Y represents

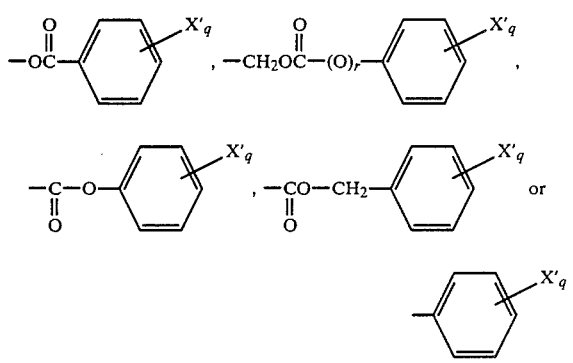

wherein X' is a chlorine or bromine atom, q is an integer of 0–5, and r is 0 or 1.

BEST MODE FOR CARRYING OUT THE INVENTION

The first monomer of this invention, namely, the carbonate compound represented by the general formula (I) can be prepared by the carbonating reaction through dehydrochlorination between bisphenol A (4,4'-isopropylidenediphenol) or its nucleus halogenated compounds and allylchloroformate or methylallylchloroformate. As specific examples of the carbonate compound represented by the general formula (I), there may be mentioned:

4,4'-isopropylidenediphenylbisallylcarbonate,
4,4'-isopropylidenediphenylbis-β-methallylcarbonate,
4,4'-isopropylidene-2,2',6,6'-tetrachlorodiphenylbisallylcarbonate,
4,4'-isopropylidene-2,2',6,6'-tetrachlorodiphenylbis-β-methallylcarbonate,
4,4'-isopropylidene-2,2',6,6'-tetrabromodiphenylbisallylcarbonate, and
4,4'-isopropylidene-2,2',6,6'-tetrabromodiphenylbis-β-methallylcarbonate.

The carbonate represented by the general formula (I) is subjected to copolymerization in the present invention, using as a second monomer a unifunctional monomer having a high refractive index as a homopolymer, because the impact resistance of a polymer obtained by polymerizing the ester alone is too small.

More particularly, the second monomer of the present invention is an unifunctional monomer represented by the general formula (II) having a refractive index of at least 1.55 as a homopolymer, capable of undergoing a radical polymerization and containing an aromatic ring. This monomer has good miscibility with the carbonate represented by the general formula (I) and is capable of maintaining good liquid homogeneity upon being poured into molds for casting-polymerization. As representative specific examples of such monomers, may be mentioned:

Vinyl, isopropenyl, allyl or β-methylallyl esters of benzoic acid and of nucleus-halogenated benzoic acids For example, vinyl, isopropenyl, ally or β-methylallyl benzoate, 2-chlorobenzoate, 3-chlorobenzoate, 4-chlorobenzoate, 2,4-dichlorobenzoate, 2,5-dichlorobenzoate, 2,6-dichlorobenzoate, 3,4-dichlorobenzoate, 3,5-dichlorobenzoate, 2,3,6-trichlorobenzoate, pentachlorobenzoate, 2-bromobenzoate, and 3-bromobenzoate.

Allyl or β-methylallyl carbonates, acrylates or methacrylates of phenol, nucleus-halogenated phenols, benzyl alcohol and of nucleus-halogenated benzyl alcohols For example, the allyl or β-methylallyl carbonates, acrylates or methacrylates of phenol, 2-chlorophenol, 3chlorophenol, 4-chlorophenol, 2,3-dichlorophenol, 2,4-dichlorophenol, 2,5-dichlorophenol, 2,6-dichlorophenol, 3,4-dichlorophenol, 2,4,5-trichlorophenol, 2,3,4,6-tetrachlorophenol, pentachlorophenol, 2-bromophenol, 3-bromophenol, 4-bromophenol, 2,4-dibromophenol, 2,4,6-tribromophenol, pentabromophenol, benzyl alcohol, 2-chlorobenzyl alcohol, 2,4-dichlorobenzyl alcohol, and 2-bromobenzyl alcohol.

Styrene, nucleus-chlorinated styrenes or nucleus-brominated styrenes

It is especially preferred to use, as unifunctional monomers having particularly good miscibility with the carbonates represented by the general formula (I), the vinyl,allyl or β-methylallyl esters of benzoic acid or of nucleus-halogenated benzoic acids, or the allyl or β-methylallyl carbonates of phenol or of nucleushalogenated phenols.

In the present invention, the proportion of each carbonate represented by the general formula (I) cannot be limited to any specific value or range because its preferred proportion may vary depending on the type of the carbonate. However, the carbonate of the general formula (I) may be used at a proportion of 20–80 wt.% or, preferably 30–70 wt.%. If the carbonate is incorporated at any proportion lower than 20 wt.%, the resultant copolymerized resin will have an extremely low surface hardness. Any proportions in excess of 80 wt.% are not preferred because the impact resistance will be lowered. Accordingly, it is preferred to use one or more of the above-described second monomers represented by the general formula (II), which are copolymerized with the carbonate represented by the general formula (I), at a total proportion of 20–80 wt.%.

Furthermore, no particular limitation is vested on the type of a radical polymerization initiator which is to be used upon conducting a copolymerization so as to obtain a lens-making resin according to this invention. It is thus preferable to use, at a proportion of 0.01–5 wt.%, a conventional peroxide such as benzoyl peroxide, p-chlorobenzoyl peroxide, lauroyl peroxide, diisopropyl peroxycarbonate, di-2-ethylhexyl peroxycarbonate or tertiary butyl peroxypivalate or a known azo compound such as azobisisobutyronitrile.

The lens-making resin according to this invention can be prepared by subjecting a mixture of at least one carbonate represented by the general formula (I), at least one of the above-described second monomer represented by the general formula (II) and a radical polymerization initiator to the known casting-polymerization method, in other words, pouring the mixture into a mold formed of a gasket or spacer and a glass-made or metallic mold and polymerizing and hardening the mixture by heating it at temperatures in the range of 50°–120° C. or irradiating ultraviolet rays to the mixture. Here, it may be possible to incorporate one or more appropriate additives such as ultraviolet stabilizer, antioxidant, coloring inhibitor, fluorescent dye and/or the like to the mixture prior to its polymerization as needed.

The thus-obtained lens-making resin according to the present invention has a high refractive index and is excellent in processability such as grinding processability, thermal resistance, solvent resistance and impact resistance. Accordingly, it can be used for eyeglass lenses, camera lenses and other optical lenses.

Some examples of the present invention will hereinafter be described, in which the designations of "part" or "parts" mean part or parts by weight and the designations of "%" mean wt.%. Further, the following testing methods were employed to determine the refractive index, grinding processability, thermal resistance, impact resistance and solvent resistance of the lens-making resins obtained in the examples.

Refractive Indexes: Measured at 20° C. by Abbe refractometer.

Processability: Each molded lens blanc was ground by a grinding machine designed to process eyeglass lenses. Samples bearing smooth ground surfaces were judged acceptable and marked by circles (O).

Thermal Resistance: Lens samples were allowed to stand in a hot air dryer at 100° C. for 2 hours and thereafter were taken out from the dryer. Samples exhibiting no coloring and no surface strain were judged acceptable and marked by circles (O).

Impact Resistance: A falling ball impact test was carried out in accordance with the FDA standards on planar plates having a thickness of 2 mm at their centers. Unbroken samples were judged as acceptable and marked by circles (O).

Solvent Resistance: Lens samples were immersed in isopropanol, acetone and benzene at room temperature for 2 days and thereafter were taken out. Samples showing no changes on their surfaces were judged as acceptable and marked by circles (O).

SYNTHESIS EXAMPLE 1

51.2 parts of 4,4'-isopropylidenediphenol were dissolved in 250 parts of chloroform, to which 68.0 parts of triethylamine were then added. While cooling the resulting mixture under stirring in a ice bath, 79.6 parts of allylchloroformate were added to the mixture drop by drop for 30 minutes. Thereafter, the reaction mixture was increased in temperature back to room temperatures and further stirred for 2 hours. The reaction product liquid thus-obtained was poured in a separation funnel and washed first with a saturated sodium hydrogencarbonate solution and then with water. The thus-formed oil layer was dried with Glauber's salt and then mixed with activated carbon under stirring. The mixture was filtered and the filtrate was concentrated to afford 80.2 parts of 4,4'-isopropylidenediphenylbisallylcarbonate as a colorless syrup (hereinafter called "Compound A").

Elementary analysis (%): Calculated for $C_{23}H_{24}O_6$: C, 69.68: H, 6.10. Found: C, 69.84: H, 5.97.

NMR $\delta_{CDCl_3}$: 1.64 (6H, S), 4.67 (4H, dd), 5.23 (2H, dd), 5.36 (2H, dd), 5.72~6.16 (2H, m), 6.96~7.20 (6H, m).

SYNTHESIS EXAMPLE 2

Procedures of Synthesis Example 1 were repeated except that 82.1 parts of 4,4'-isopropylidene-2,2',6,6'-tetrachlorodiphenol were used in place of 51.2 parts of 4,4'-isopropylidenediphenol, thereby obtaining a white solid. It was recrystallized from isopropanol to give 90.1 parts of 4,4'-isopropylidene-2,2',6,6'-tetrachlorodiphenylbisallylcarbonate (hereinafter called "Compound B") (m.p. 109°–111° C.).

Elementary analysis (%): Calculated for $C_{23}H_{20}Cl_4O_6$: C, 51.71: H, 3.77: Cl, 26.55. Found: C, 51.83: H, 3.49: Cl, 26.33.

NMR $\delta_{CDCl_3}$: 1.64 (6H, S), 4.76 (4H, dd), 5.30 (2H, dd), 5.41 (2H, dd), 5.76~6.22 (2H, m), 7.40 (4H, S).

SYNTHESIS EXAMPLE 3

Procedures of Synthesis Example 1 were repeated except that 122 parts of 4,4'-isopropylidene-2,2',6,6'-tetrabromodiphenol were used in place of 51.2 parts of 4,4'-isopropylidenephenol, thereby obtaining a white solid. It was recrystallized from isopropanol to give 149 parts of 4,4'-isopropylidene-2,2,6,6'-tetrabromodiphenylbisallylcarbonate (hereinafter called "Compound C") (m.p. 104°–105° C.).

Elementary analysis (%): Calculated for $C_{23}H_{20}Br_4O_4$: C, 38.80: H, 2,83: Br, 44.89. Found: C, 38.76: H, 2.95: Br, 44.47.

NMR $\delta CDCl_3$: 1.63 (6H, S), 4.74 (4H, dd), 5.28 (2H, dd), 5.41 (2H, dd), 5.76~6.20 (2H, m), 7.32 (4H, S).

SYNTHESIS EXAMPLE 4

Procedures of Synthesis Example 3 were repeated except that 90.8 parts of β-methallylchloroformate were used in place of 79.6 parts of allylchloroformate employed in synthesis Example 3, thereby obtaining 154 parts of 4,4'-isopropylidene-2,2',6,6'-tetrabromodiphenylbisβ-methallylcarbonate (hereinafter called "Compound D") (m.p. 85°–90° C.).

Elementary analysis (%): Calculated for $C_{25}H_{24}Br_4O_6$: C, 40.57: H, 3.27: Br, 43.19. Found: C, 40.32: H, 3.51: Br. 43.00.

NMR $\delta CDCl_3$: 1.63 (6H, S), 1.84 (6H, dd), 4.75 (4H, S), 5.30 (2H, d), 5.40 (2H, d), 7.32 (4H, S).

EXAMPLE 1

A liquid mixture, which had been obtained by heating a mixture of 50 parts of Compound A resulted from Synthesis Example 1 and 50 parts of 2,4,6-tribromophenylallylcarbonate to 60° C., was maintained at 50° C., and 2 parts of benzoyl peroxide was dissolved into the liquid mixture. The thus-prepared mixed solution was poured into a mold which was formed of a glass mold and a soft polyvinylchloride gasket and had been preheated at 50° C. in advance. The mixed solution was held in the mold at 60° C. for 24 hours, at 80° C. for 2 hours and at 100° C. for 2 hours to carry out the copolymerization of the contents. Then, the thereby-formed resin was taken out from the mold and subjected to the refractivity measurement, processability test, and tests of thermal resistance, impact resistance and solvent resistance. As a result, it was found that the thus-obtained colorless transparent lens had a refractive index of 1.595 and was excellent in the grinding processability, thermal resistance, impact resistance and solvent resistance.

EXAMPLES 2-10

In the same manner as in Example 1, monomers were copolymerized at different proportions to prepare lenses. Results are shown in Table 1.

one unifunctional monomer represented by the general formula (II):

wherein R' is a hydrogen atom or a methyl group and Y represents

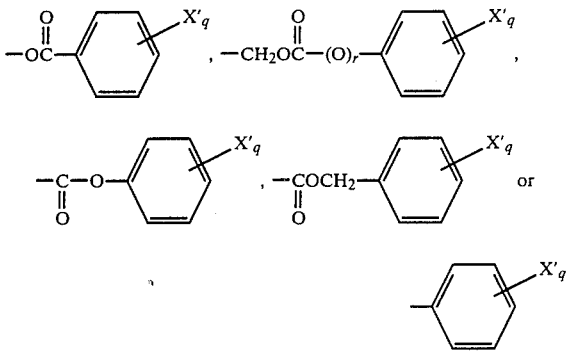

wherein X' is a chlorine or bromine atom, q is an integer of 0-5, and r is 0 or 1.

2. A lens comprising a copolymer of at least one carbonate compound represented by the general formula (I):

TABLE 1

| Example | Composition of Polymers | (parts) | Refractive Index | Grinding Processability | Thermal Resistance | Impact Resistance | Solvent Resistance |
|---|---|---|---|---|---|---|---|
| 1 | Compound A | (40) | 1.595 | o | o | o | o |
|   | 2,4,6-tribromophenylallylcarbonate | (60) | | | | | |
| 2 | Compound A | (40) | 1.588 | o | o | o | o |
|   | allyl 3-bromobenzoate | (60) | | | | | |
| 3 | Compound B | (40) | 1.590 | o | o | o | o |
|   | vinyl 2-chlorobenzoate | (60) | | | | | |
| 4 | Compound B | (40) | 1.591 | o | o | o | o |
|   | allyl 2-chlorobenzoate | (60) | | | | | |
| 5 | Compound C | (50) | 1.594 | o | o | o | o |
|   | vinyl benzoate | (50) | | | | | |
| 6 | Compound C | (50) | 1.604 | o | o | o | o |
|   | vinyl 2-chlorobenzoate | (50) | | | | | |
| 7 | Compound C | (50) | 1.602 | o | o | o | o |
|   | allyl 2-chlorobenzoate | (50) | | | | | |
| 8 | Compound D | (50) | 1.589 | o | o | o | o |
|   | vinyl benzoate | (50) | | | | | |
| 9 | Compound D | (50) | 1.597 | o | o | o | o |
|   | styrene | (50) | | | | | |
| 10 | Compound D | (60) | 1.595 | o | o | o | o |
|   | phenyl methacrylate | (40) | | | | | |

We claim:

1. A resin for high-refractivity lenses, formed by polymerizing at least one carbonate compound represented by the general formula (I):

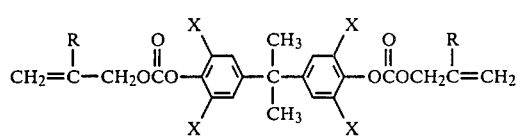

wherein X is a hydrogen, chlorine or bromine atom, and R is a hydrogen atom or a methyl group with at least one unifunctional monomer represented by the general formula (II):

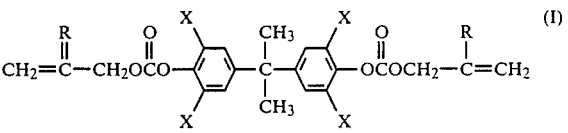

wherein X is a hydrogen, chlorine or bromine atom, and R is a hydrogen atom or a methyl group and at least one unifunctional monomer represented by the general formula (II):

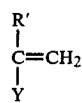 (II)
wherein R' is a hydrogen atom or methyl group and Y represents
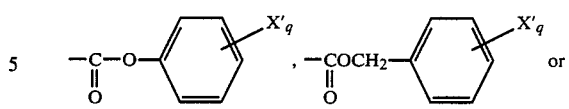,
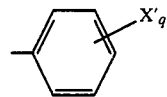
wherein X' is a chlorine or bromine atom, q is an integer of 0–5, and r is 0 or 1.
* * * * *